United States Patent
Rose, Jr.

(10) Patent No.: US 7,231,300 B1
(45) Date of Patent: Jun. 12, 2007

(54) PRODUCING HIGH-RESOLUTION, REAL-TIME SYNTHETIC METEOROLOGICAL CONDITIONS FROM RADAR DATA

(75) Inventor: Bruce L. Rose, Jr., Smyrna, GA (US)

(73) Assignee: The Weather Channel, Inc., Atlanta, GA (US)

( * ) Notice: Subject to any disclaimer, the term of this patent is extended or adjusted under 35 U.S.C. 154(b) by 6 days.

(21) Appl. No.: 11/021,801

(22) Filed: Dec. 22, 2004

(51) Int. Cl.
*G01W 1/00* (2006.01)

(52) U.S. Cl. .......................................... 702/3

(58) Field of Classification Search ................ 702/2–5; 342/26 R–26 D
See application file for complete search history.

(56) References Cited

U.S. PATENT DOCUMENTS

| | | | |
|---|---|---|---|
| 5,406,481 A * | 4/1995 | Shinozawa et al. ............ | 702/3 |
| 5,440,483 A * | 8/1995 | Badoche-Jacquet et al. ... | 702/3 |
| 5,717,589 A * | 2/1998 | Thompson et al. ............ | 702/3 |
| 5,796,611 A * | 8/1998 | Ochiai et al. .................. | 702/3 |
| 5,974,360 A * | 10/1999 | Otsuka et al. ................. | 702/3 |
| 6,128,578 A * | 10/2000 | Sakaino et al. ................ | 702/3 |
| 6,278,947 B1 * | 8/2001 | Baron et al. .................... | 702/3 |
| 6,542,825 B2 * | 4/2003 | Jones et al. ..................... | 702/3 |
| 6,581,009 B1 * | 6/2003 | Smith ............................. | 702/3 |
| 7,109,913 B1 * | 9/2006 | Paramore et al. ......... | 342/26 B |
| 2004/0043760 A1 * | 3/2004 | Rosenfeld et al. ....... | 455/414.3 |

OTHER PUBLICATIONS

Doviac, et al., "Single-Parameter Measurement to Estimate the Rainfall Rate", *Doppler Radar and Weather Observations*, 1993, 8.4-8.4.2, pp. 198-203.

Rasmussen, R.M. et al., "The Estimation of Snowfall Rate Using Visibility", *Journal of Applied Meteorology*, 1999, 38, 1542-1563.

* cited by examiner

*Primary Examiner*—Donald McElheny, Jr.
(74) *Attorney, Agent, or Firm*—Woodcock Washburn LLP

(57) ABSTRACT

Methods and articles of manufacture for estimating or deriving weather observations for any given location. Using weather radar data, a correspondence between the weather radar coverage, intensity and the precipitation type may be monitored. From that, a measure of corroboration between the radar data and surface weather conditions may be established. Through radar calibration statistics and estimates of ground-based precipitation, the corroboration can be iteratively tuned, resulting in a final improved estimate of the present weather and associated meteorological fields. The associated meteorological fields may include at least one of a probability of precipitation, precipitation accumulation, precipitation rate, and horizontal visibility.

22 Claims, 4 Drawing Sheets

Fig. 2

| Fingerprint | | Tuscaloosa, | | AL |
|---|---|---|---|---|
| Metar Id: KTCL, Lat: 33.21, Lon: -87.62, Radius: 2 pixels ||||| 
| ■ | ■ | ■ | R05 | R05 |
| R10 | ■ | ■ | R20 | R20 |
| R15 | R05 | R15 | ■ | ■ |
| R15 | R15 | R20 | R20 | R20 |
| R15 | R15 | R20 | R20 | R20 |

PRODUCING HIGH-RESOLUTION, REAL-TIME SYNTHETIC METEOROLOGICAL CONDITIONS FROM RADAR DATA

FIELD OF THE INVENTION

The present invention relates to weather data or content analysis. In particular, the present invention is directed to a system and method of utilizing radar and/or satellite imagery to provide an indication of surface weather conditions for any selected point or ground-based point.

BACKGROUND OF THE INVENTION

In the United States, the commercial weather sector provides forecasts, observations, and other meteorological content to businesses and consumers for direct fees and other forms of compensation. There is, at any time, a strong drive for value-added differentiation in this sector, since most of the basic weather forecast and observational data originates from a freely available, public data source—the National Weather Service (NWS).

Weather information vendors attempt to add value to the basic, public-domain database in many ways to distinguish themselves over other vendors. One area in which value-added products and services are being provided is surface weather observations or "Current Conditions." The NWS along with other public providers like the FAA and DoD produce about 1,400 so-called official surface weather observations each hour (or more frequently, as conditions warrant) in the Continental US (CONUS). Most of the instruments are located near airports or airfields.

One limitation is that there are often considerable distances between reporting stations, especially in the Inter-mountain West and Northern Plains. If the 1,400 official observing stations were spread evenly over the CONUS, then a single station would need to represent about 2,000 square miles of land surface; an area of about 45 miles on each side. This is poor resolution for sensing and measuring many weather phenomena such as severe thunderstorms or tornadoes. Such small-scale events are often "invisible" or aliased as a result of the poor spatial and temporal resolution within the official observing network. This is can be dangerous in respect to the protection of life and property.

Some private firms have installed low-cost weather instruments that augment the official network of government-provided weather observations. These private "mesoscale" observing networks are often used in concert with internet or wireless device delivery applications, and can provide much more local and timely weather information to a customer as compared to the basic observational data provided by the NWS by filling-in gaps in time and space. This way, customers may be able to receive temperature and other weather information from an observing point that is nearby rather than a distant airport. Moreover, the customer might receive these observations with higher temporal frequency, on demand, or with less time delay than via the generic public data source.

However, there are several problems and limitations with such private networks of weather observing stations. One problem is that the instrument packages are limited, and offer and provide only basic meteorological quantities. These typically include temperature, humidity, rainfall, pressure, wind speed and direction. The automated instrument packages typically do not detect the present weather or type of precipitation (rain, snow, ice, thunderstorm, etc.), nor can they detect important obstructions to visibility such as fog, blowing snow, and blowing dust. The instruments cannot sense the cloud cover, cloud ceilings, or types of clouds. While the instruments may detect rainfall by recording rainfall that falls into some form of rain gauge sensor, they generally fail to record snowfall and other types of measurable precipitation. Worse, if the rainfall sensors become ice or snow-bound, they will stop recording any precipitation over long periods in colder climates.

Another problem with private weather observing stations is that the instrument packages providing the meteorological data are often low-cost, low-quality, and can suffer from significant sensitivity, bias, and calibration problems. Further, these instruments are often poorly sited or installed. For example, to accurately sample the horizontal wind speed and direction, the location of the cup anemometer, wind vane, or other wind recording instrument is crucial. The identification of true north for proper directional reference can be difficult to determine.

For all observational sensors, there exists standard installation and maintenance protocols recommended by the NWS and other agencies. In many cases, these private networks do not comply with such protocols or standards and maintenance of instruments is often neglected. This is especially problematic with mechanical instruments such as wind and rainfall sensors, where regular maintenance by trained technicians is necessary. Depending on the harshness of the climate, sensors and instruments require complete or component-level replacement on a regular basis.

The placement of low-end and incomplete sensor packages does not scale well, and cannot fill the increasing need for a broad network of fine-scale information on current weather conditions. Thus, there is a need for a system that can provide surface weather observations for discrete locations without requiring the addition of costly fixed or in situ sensors for each location. The present invention provides for such a system.

SUMMARY OF THE INVENTION

The present invention is directed to methods and articles of manufacture for estimating or deriving weather observations for any given location from radar data. Using high-resolution, composited weather radar data, a correspondence between the weather radar coverage, intensity and the precipitation type may be monitored. From that, a measure of corroboration between the radar data and surface weather conditions at official observing station may be established. Through radar calibration statistics and estimates of ground-based precipitation, the corroboration can be iteratively tuned, resulting in a final improved estimate of the present weather and associated meteorological fields at location that lie between or near the sparse network of official observing sites.

According to a method for estimating current weather conditions, the present invention receives real-time radar imagery, receives an indication of a location of interest, and derives meteorological components related to the location of interest from the radar imagery. The meteorological components may include at least one of a probability of precipitation, precipitation accumulation, precipitation rate, and horizontal visibility.

The method may include sampling the radar imagery around the location of interest to ascertain sampled radar imagery, and defining a matrix of reflectivity values from the sampled radar imagery. From the reflectivity values and other inputs, the meteorological components are derived for the location of interest.

Additional features and advantages of the invention will be made apparent from the following detailed description of illustrative embodiments that proceeds with reference to the accompanying drawings.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention where like elements have like reference numerals; however, the invention is not limited to the specific methods and instrumentalities disclosed. In the drawings:

FIG. 2 is an exemplary radar fingerprint;

DETAILED DESCRIPTION OF ILLUSTRATIVE EMBODIMENTS

The present invention provides systems and methods for estimating observed surface weather conditions in locations between the official reporting stations. As such, the present invention may estimate the surface weather conditions of large numbers of locations, by zip code, place names, and/or GPS triangulations. A frequent problem encountered in the current observation network arises when a point is found to be experiencing "Light Rain," and a nearby point is simultaneously experiencing "Light Snow." Conventionally, there is no practical way to directly estimate the weather found between these two points. The present invention overcomes this limitation by interpolating conditions to points with unknown values that lie between the known points. The new interpolated values can be used to produce the discrete enumerated weather for these intermediate locations.

Figure 1:
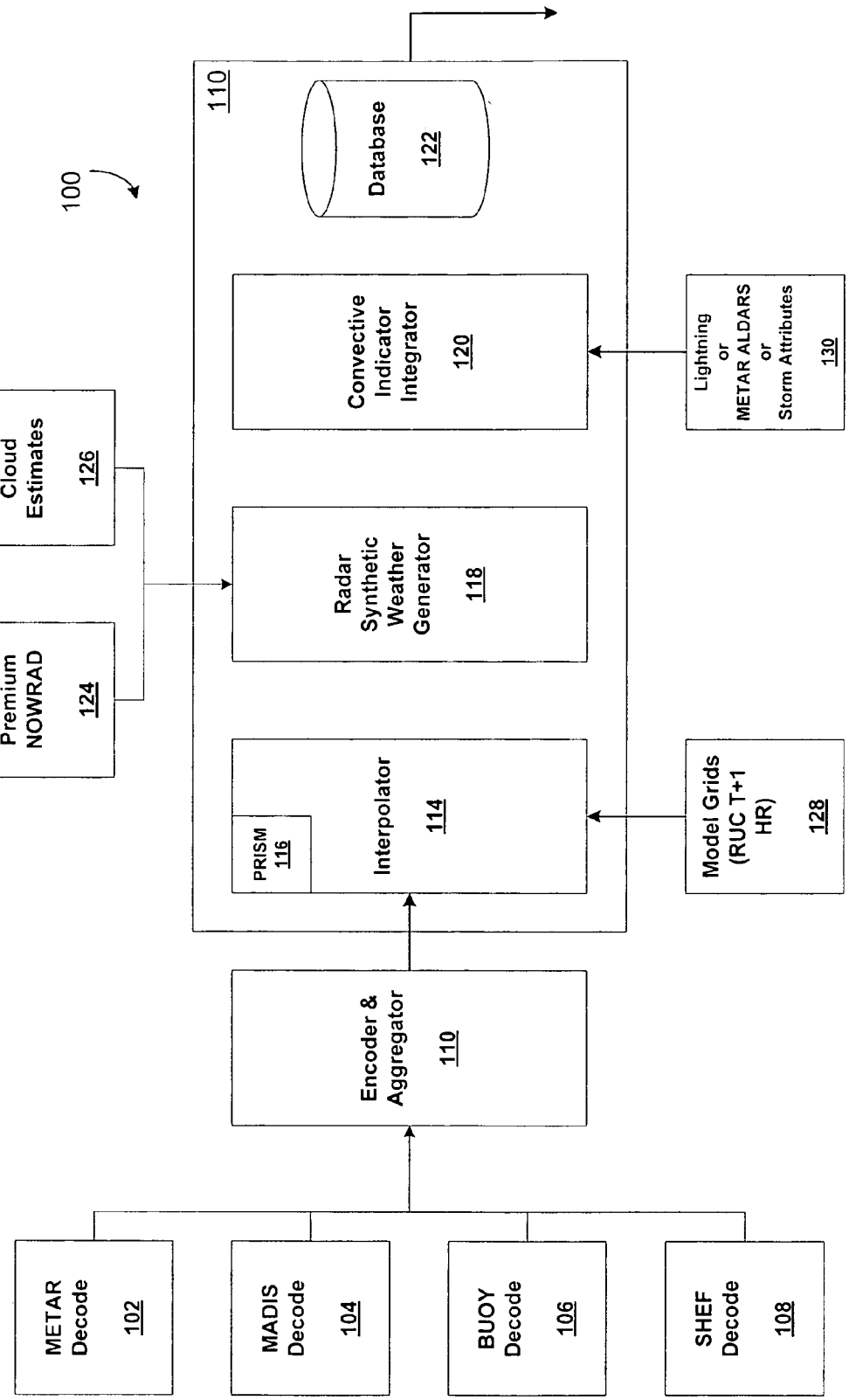
FIG. 1 is an overview of an environment in which the present invention may be embodied.

Referring to FIG. 1, there is illustrated a high-level overview of a system in which the present invention may be implemented. The system 100 ingests the NWS, DOD, or FAA observations, which number approximately 1,500 nationwide. Inputs to the system include METeorological Aerodrome Report (METAR) data 102, Meteorological Assimilation Data Ingest System (MADIS) data 104, BUOY data 106, and Standard Hydrometeorological Exchange Format (SHEF) data 108. Those of ordinary skill in the art will fully appreciate the input data sets and the information contained therein. The data inputs are input to an encoder/aggregator 10 which then outputs the data to an observation engine 112.

The observation engine 112 processes the aggregated and encoded data through various calculations (e.g., interpolator 114, radar synthetic weather generator 118, convective indicator integrator 120) to determine an estimated surface weather observation for a location, and stores the result in a database 122. The calculations made by processes 114, 118 and 120 may use PRISM high resolution climatology 116, NOWRad data 124, satellite cloud estimates 126, and lightning or METAR Automated Lightning Detection and Reporting System (ALDARS) or storm attribute data 130 as part of their determination. The estimated present weather conditions and associated meteorological fields for the selected location is provided as an output of the engine 110.

The present invention is particularly directed to the radar synthetic weather generator 1118, which provides an estimation of probability of precipitation, horizontal visibility, and precipitation accumulation or accumulation rate. Weather radar information in the form of national composites or mosaics (e.g., NOWrad available from WSI Corporation, Andover, Mass.) are used as a proxy for precipitation type and precipitation accumulation rate at any point within the NOWrad domain.

The process of estimating the present weather using radar data 124 and satellite cloud estimates 126 in the radar synthetic weather generator 118 is called herein "radar fingerprinting." FIG. 2 illustrates an exemplary radar fingerprint centered on Tuscaloosa, Ala. For each pixel, a reflectivity value is shown. The details of the radar fingerprinting process and the various calculations performed by the radar synthetic weather generator 118, and resulting estimates therefrom, will now be described.

1. Probability of Precipitation (PoP)

The calculation of POP is performed as an intermediate quantity that ultimately leads to the selection of one description of present weather (or enumeration) that best portrays the conditions at the target point. The probability of precipitation estimation is a function of the radar coverage, the average reflectivity, the surface dew point depression, and any spatial bias of radar reflectivity at the target point as described by relationship 1.1:

$$P_{06} = \frac{\bar{r}_0}{\hat{r}} C_v \left[ \frac{(\hat{T}_{DD} - \bar{T}_0 + \bar{T}_D)}{\hat{T}_{DD}} \right] \zeta_{CF} \quad \text{Eq. 1.1}$$

and, $(\bar{T}_0 - T_D) \leq \hat{T}_{DD}$, and $P_{06} \leq 1.00$ where:

$P_{06}$ Probability of Precipitation $\bar{r}_0$ Average non-zero reflectivity near the target point in dBZ $\hat{r}$ A scaling parameter (Default value is 20 dBZ)

$C_v$ Radar coverage above the target point (unitless)

$\hat{T}_{DD}$ A scaling parameter for dew point depressions in F (default value of 40 F)

$\bar{T}_0$ Estimated temperature at the target point $T_D$ Estimated dew point temperature at the target point $\zeta_{CF}$ Center/fringe bias scaled to 1.0

As an example, if a radar fingerprint has a coverage of 90%, where the average reflectivity of pixels with non-zero reflectivity is 15.0, the temperature is 74° F., the dew point is 60° F. and the center-fringe bias is 1.00, the result of Eq. 1.1 with default scaling values for reflectivity and dew point depressions, would be as follows:

$$\frac{0.15}{0.20} 0.90 \left[ \frac{(40 - 74 + 60)}{40} \right] 1.00 \times 100 = 35.1\% \quad \text{Eq. 1.2}$$

Although, the resulting $P_{06}$ is small, this would likely produce an enumerated result of light rain showers, which is consistent with the radar fingerprint; that is, widespread, but mainly light warm-season liquid precipitation.

The ratio of average reflectivity to scaling reflectivity is allowed to exceed 1.00. Thus, higher reflectivity's that approach or exceed the scaling value will have a strong influence on $P_{06}$. A significant coverage of high average reflectivity will result in a $P_{06}$ near 100%. This is desirable, because high probability inputs will lead to categorical and heavier precipitation types or enumerations. The $P_{06}$ should not allowed exceed unity or be less than 0.0%.

The radius of the radar fingerprint, R, is any integer greater than 1 and is defined as:

$$n=m=2R+1. \qquad \text{Eq. 1.3.}$$

Therefore, a radar fingerprint may be defined as a square matrix (n=m), where n and m are always odd. In this way, geographic location of the target point can always be found at the geometric center of the matrix, and beneath the cell denoted as (i,j)=(R+1, R+1). Analysis of the fingerprint can produce scalars or metrics that are useful in transforming the fingerprint into an estimate of current conditions or present weather.

The radar coverage, $C_v$, is defined as the total proportion of cells within the domain of the radar fingerprint that contain non-zero reflectivity:

$$C_v = \frac{\sum_{i=1}^{m}\sum_{j=1}^{n} \text{mask}(i,j)}{n^2}, \qquad \text{Eq. 1.4}$$

where mask(i,j)=1 when the reflectivity, $r_0(i,j),>0$; mask (i,j)=0 otherwise.

Other masks can be defined for the different species of precipitation that are color-coded on the NOWrad mosaic; namely, rain, snow, or mixed. In this case, the reflectivity is denoted with a subscript of r, s, or x depending on the type of precipitation analyzed in the NOWrad pixel field.

Average reflectivity is related to the intensity of precipitation or the precipitation rate. Over the domain of cells with non-zero reflectivity, the average reflectivity my be defined as:

$$\bar{r}_0 = \frac{\sum_{i=1}^{m}\sum_{j=1}^{n} r_0(i,j)}{\sum_{i=1}^{m}\sum_{j=1}^{n} \text{mask}(i,j)}, \qquad \text{Eq. 1.8.}$$

where $r_0(i,j)$ is summed only when $r_0(i,j)>0$, and average reflectivity is undefined when no reflectivity exists in the domain.

It is desirable to determine if the radar reflectivity or echoes are clustered near the central target point or are clustered remotely. A simple metric of this bias may be determined by comparing the average reflectivity near the center of the fingerprint domain to that found near the fringes. Using the index and dimensional characteristics of the square fingerprint matrix, the center and fringe bias may be defined as:

$$\zeta_C = \frac{\sum_{i=R+1-\text{int}(R/2)}^{R+1+\text{int}(R/2)}\sum_{j=R+1-\text{int}(R/2)}^{R+1+\text{int}(R/2)} r_0(i,j)}{[\text{int}(n/2)+1]^2}, \qquad \text{Eq. 1.9.}$$

where int(R/2) is a truncation function such that the fingerprint radius divided by 2 is always expressed as a counting number. R+1 is used in the summation indices since it represents the center point cell address in both i and j indices.

The fringe reflectivity is partitioned from the already computed total average reflectivity summations and mask summations used as numerator and denominator in Eq. 1.8:

$$C_{vr} = \frac{\sum_{i=1}^{m}\sum_{j=1}^{n} mask(i,j)_r}{n^2}, \text{ where } mask(i,j)_r = 1 \text{ when the reflectivity,} \qquad \text{Eq. 1.5.}$$
$$r_r(i,j) > 0 \text{ and the reflectivity species is of type rain;}$$
$$mask(i,j)_r = 0 \text{ otherwise.}$$

$$C_{vs} = \frac{\sum_{i=1}^{m}\sum_{j=1}^{n} mask(i,j)_s}{n^2}, \text{ where } mask(i,j)_s = 1 \text{ when the reflectivity,} \qquad \text{Eq. 1.6.}$$
$$r_s(i,j) > 0 \text{ and the reflectivity species is of type rain;}$$
$$mask(i,j)_s = 0 \text{ otherwise.}$$

$$C_{vx} = \frac{\sum_{i=1}^{m}\sum_{j=1}^{n} mask(i,j)_x}{n^2}, \text{ where } mask(i,j)_x = 1 \text{ when the reflectivity,} \qquad \text{Eq. 1.7.}$$
$$r_x(i,j) > 0 \text{ and the reflectivity species is of type rain;}$$
$$mask(i,j)_x = 0 \text{ otherwise.}$$

$$\zeta_F = \frac{\sum_{i=1}^{m}\sum_{j=1}^{n} r_0(i,j) - \sum_{i=R+1-\text{int}(R/2)}^{R+1+\text{int}(R/2)} \sum_{j=R+1-\text{int}(R/2)}^{R+1+\text{int}(R/2)} r_0(i,j)}{n^2 - [\text{int}(n/2)+1]^2},$$ Eq. 1.10.

The close-in or center average reflectivity and the remote or fringe average reflectivity are now properly normalized and can be expressed as a simple ratio:

$$\zeta_{CF} = \frac{\zeta_C}{\zeta_F}$$ Eq. 1.11.

Figure 3:
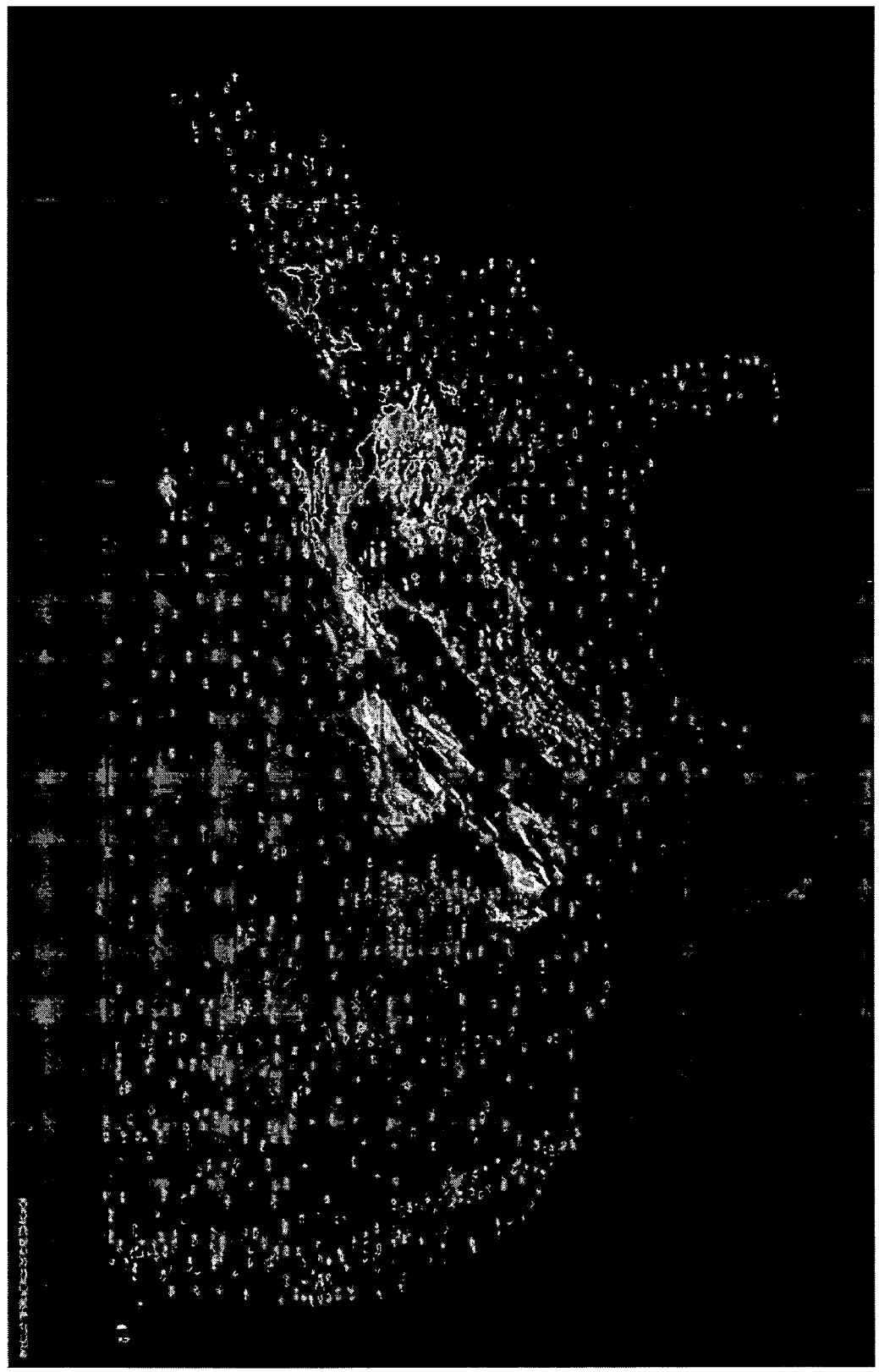
FIG. 3 is an exemplary NOWrad mosaic from which the radar fingerprint is derived.
Figure 4:
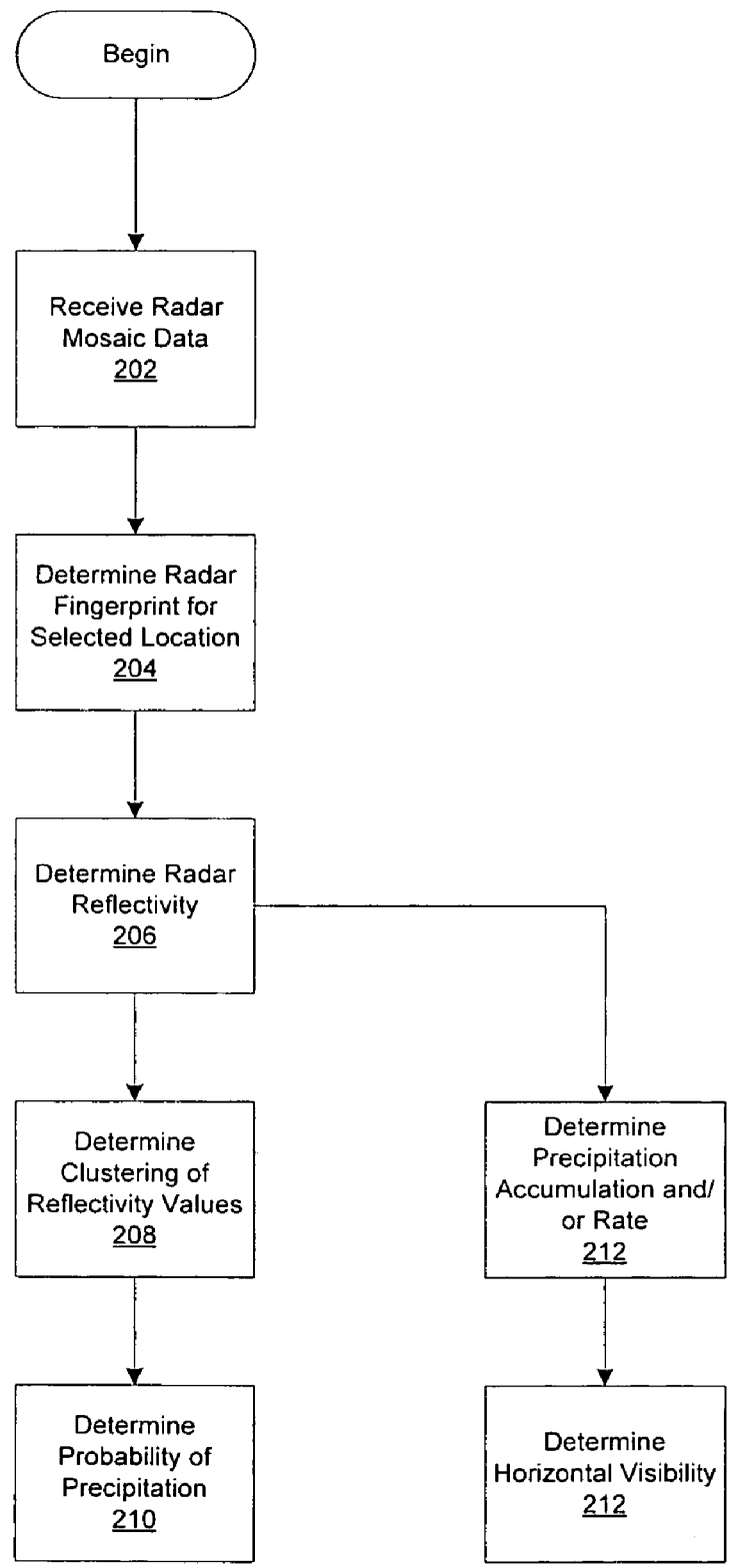
FIG. 4 is a flowchart of the processes performed by a radar synthetic weather generator.

With reference to FIGS. 2–4, an example of the application of a radar fingerprint procedure will now be described. The engine 110 periodically receives NOWrad data (step 202) and a selection of a location to be analyzed is made, e.g., Tuscaloosa, Ala. Referring to FIG. 2, there is shown the radar fingerprint of radius 2 pixels sampled from a WSI Premium NOWrad Mosaic (see, FIG. 3) on 10 Jan. 2004 at approximately 1526 UTC (step 204). The target point is identified as KTCL and is represented below the center pixel in this matrix. Each cell displays the radar reflectivity in dBZ (step 206) and is color coded to indicate the precipitation type of rain, snow, or a mixture of frozen and unfrozen precipitation. Where no reflectivity is detected by the radar, the cell or pixel is echo-free. The color-coding, although not visible in FIG. 2, shows that the precipitation is rain.

The radius, R, is 2, thus the square matrix has dimensions of m by n, m=n=2R+1. The matrix has 25 cells or $(2R+1)^2=m^2=n^2$ pixels. The central or target point, KTCL, is located beneath (i,j)=(3,3) or (R+1, R+1). The indices of i,j for the 5×5 matrix would be:

$$\begin{bmatrix} i=1, j=1 & 1,2 & 1,3 & 1,4 & 1,5 \\ 2,1 & 2,2 & 2,3 & 2,4 & 2,5 \\ 3,1 & 3,2 & 3,3 & 3,4 & 3,5 \\ 4,1 & 4,2 & 4,3 & 4,4 & 4,5 \\ 5,1 & 5,2 & 5,3 & 5,4 & 5,5 \end{bmatrix}$$

The mask and reflectivity values represent cells that are echo-free (0) and those with the echoes (1 in the case of mask and reflectivity in dBZ in the case of $r_0$. No distinction of intensity is made in the mask values:

$$\begin{bmatrix} 0 & 0 & 0 & 1 & 1 \\ 1 & 0 & 0 & 1 & 1 \\ 1 & 1 & 1 & 1 & 1 \\ 1 & 1 & 1 & 1 & 1 \\ 1 & 1 & 1 & 1 & 1 \end{bmatrix} \begin{bmatrix} 0 & 0 & 0 & 5 & 5 \\ 10 & 0 & 0 & 20 & 20 \\ 15 & 5 & 15 & 25 & 25 \\ 15 & 15 & 20 & 20 & 20 \\ 15 & 15 & 20 & 20 & 20 \end{bmatrix}$$

In this example, the only precipitation type seen in the fingerprint is of type=Rain. Thus, the partitioned mask, $\text{mask}_r$, and reflectivity matrices would be identical to mask (i,j), and $r_0$(i,j) and the snow and mixed-precipitation matrices would be null.

Using Eq. 1.9–1.11 to determine the center and fringe bias (step 208), the center domain $r_0$ and mask matrices would appear as follows:

$$\begin{bmatrix} 0 & 0 & 0 & 0 & 0 \\ 0 & 0 & 0 & 20 & 0 \\ 0 & 5 & 15 & 25 & 0 \\ 0 & 15 & 20 & 20 & 0 \\ 0 & 0 & 0 & 0 & 0 \end{bmatrix} \begin{bmatrix} 0 & 0 & 0 & 0 & 0 \\ 0 & 0 & 0 & 1 & 0 \\ 0 & 1 & 1 & 1 & 0 \\ 0 & 1 & 1 & 1 & 0 \\ 0 & 0 & 0 & 0 & 0 \end{bmatrix}$$

The center bias calculation for this example is:

$$\zeta_C = \frac{\sum_{i=2}^{4}\sum_{j=2}^{4} r_0(i,j)}{[\text{int}(n/2)+1]^2} = \left(\frac{120}{9}\right) = 13.33$$ (Eq. 1.9 rep)

The fringe bias is expressed as a difference between the total domain reflectivity and the total number of cells differenced with those values for the center domain:

$$\zeta_F = \frac{\sum_{i=1}^{5}\sum_{j=1}^{5} r_0(i,j) - \sum_{i=2}^{4}\sum_{j=2}^{4} r_0(i,j)}{n^2 - [\text{int}(n/2)+1]^2} =$$
$$\left(\frac{325-120}{25-9}\right) = \left(\frac{205}{16}\right) = 12.81$$ (Eq. 1.10 rep)

Finally, the center-fringe bias is expressed as a ratio of Eq. 1.9 and 1.10. In this example, there is a slight positive bias towards the center which is, at least qualitatively, consistent with the appearance of the radar fingerprint. This would produce a slight enhancement of derived $P_{06}$ according to Eq. 1.1 (step 210):

$$\zeta_{CF} = \frac{\zeta_C}{\zeta_F} = \left(\frac{13.33}{12.81}\right) = 1.04$$ (Eq. 1.11 rep)

2. Precipitation Accumulation or Precipitation Rate

There is a well-known semi-empirical relationship between radar reflectivity and precipitation accumulation or precipitation rate observed at the surface. The relationship may be based upon the so-called z-R relationship which is expressed as an exponential (see, Doviac et al., 1993: *Doppler Radar and Weather Observations*, $2^{nd}$ Ed., Academic Press, Orlando, Fla., which is incorporated herein by reference in its entirety):

$$z = Aq^b$$ Eq. 1.12.

where:

z Radar reflectivity factor in units of $mm^6\ m^{-3}$

A A scaling parameter b a scaling parameter q Precipitation rate in $mm\ hr^{-1}$.

In the radar fingerprint inputs, the reflectivity factor is expressed as simple reflectivity in units of dBZ. The relationship between z and r is:

$$r = 10\ \log_{10}[z]$$ Eq. 1.13a.

The inverse of this relationship is more useful to the radar fingerprint transformation since the input from the fingerprint is in dBZ:

$$\bar{z}_0 = \frac{10^{\bar{r}_0}}{10} \qquad \text{Eq. 1.13b.}$$

Solving Eq. 1.12 for q, using the average reflectivity found from the radar fingerprint, converting this to radar reflectivity factor, and converting to English units produces this solution for precipitation rate in inches hr$^{-1}$ (step 212):

$$\bar{q}_0 = \exp\left[\frac{\ln\left(\frac{\bar{z}_0}{A}\right)}{b}\right] / 25.4 \qquad \text{Eq. 1.14.}$$

The radar operations center of the National Weather Service uses this basic z-R formula in their Doppler radar systems (e.g., WSR 88-D's) to produce precipitation accumulation estimates. The coefficients for A and b are determined by the radar operator a priori to any precipitation event, and have the following possible settings:

TABLE 1

| Relationship | Optimum for: | Comments | Suggested selection criteria |
|---|---|---|---|
| Marshall-Palmer (z = 200 q$^{1.6}$) | General stratiform precipitation events | This formula is a default for most applications and is derived directly from theoretical consideration of drop size distributions found in typical mid-latitude precipitating systems. | The default selection if no other regime can be determined |
| East Cool Stratiform (z =130 q$^{2.0}$) | Winter stratiform precipitation - east of continental divide | Also is useful for orographic rainfall- in the eastern U.S. | Longitude less than 100° West, no lightning detected, temperatures below 55 F. |
| West cool stratiform (z = 75 q$^{2.0}$) | Winter stratiform precipitation- west of continental divide | Also is useful for orographic rainfall-in the western U.S. | Longitude greater than or equal to 100° West and other criteria equal to previous equation for stratiform precipitation. |
| WSR-88D Convective (z = 300 q$^{1.4}$) | Summer deep convection associated with typical thunderstorms | Also is useful for other non-tropical convection. | Lightning is present, temperatures above 55 F, Julian Date is greater than April 1 and Less than December 1. |
| Rosenfeld Tropical (z = 250 q$^{1.2}$) | Tropical convective systems | | No lightning, dew point is greater than 70 F, temperature is greater than 75 F. Longitude is less than 100° West. |

3. Horizontal Visibility

Visibility is strongly related to precipitation intensity and precipitation type (particularly with snowfall), but this relationship is complicated by non-precipitating obstructions to visibility like fog and mist. Fog, in particular, is often present with rainfall and snowfall due to the near saturated state of the near-surface atmosphere during times of significant precipitation. Additionally, wind speed appears to reduce visibility with falling precipitation, especially when the precipitation type is snow or the winds are strong (although, this effect is debated in the literature).

A simple semi-empirical relationship between visibility and snowfall rate may be expressed as follows (step 212) (see, Rasmussen et al., 1999: "The Estimation of Snowfall Rate Using Visibility," *Journal of Applied Meteorology*, 18, 1542–1563, which is incorporated herein by reference in its entirety):

$$vis = \frac{1.304 c_3 v_t}{q_s} \qquad \text{Eq. 1.14}$$

where:

vis horizontal visibility in cm $c_3$ constant in g cm$^{-2}$ $v_t$ terminal fall velocity of the snowfall in cm s$^{-1}$ $q_s$ snowfall rate expressed as melted liquid equivalent in cm s$^{-1}$ Values for $c_3$ may range between 0.02 g cm$^{-2}$ for dry snow to 0.08 g cm$^{-2}$ for wet snow. Snowfall terminal velocities between 1 m s$^{-1}$ and 2 m s$^{-1}$ have been recorded with faster fall rates associated with the wetter, heavier snowfall. It is noted that Eq. 1.14 is generally used for a precipitation type of snow. However, this equation may be used for all precipitation types and temperature ranges by manipulating the fall velocity and constant of proportionality, $c_3$. This creates a significant jump to higher visibilities when the precipitation type transitions from snow to rain which is consistent with observations.

In accordance with the present invention, an assignment of fall velocities based on precipitation type:

| | |
|---|---|
| Dry snow (T < 25 F) | 1 ms$^{-1}$ |
| Wet Snow & drizzle | 2 ms$^{-1}$ |
| Any mixed precipitation | 4 ms$^{-1}$ |
| Rain/Liquid | 6.5 ms$^{-1}$ |

The proportionality constant, $c_3$, will be assigned using a simple linear relationship:

$$c_3(T) = aT + b, \ (10° \text{ F.} < T < 75° \text{ F.}) \qquad \text{Eq. 1.15.}$$

For all temperatures above 75° F., $c_3$ will be held constant at 0.18 g cm$^{-2}$, and for all temperatures below 10° F., $c_3$ will be held constant at 0.02 g cm$^{-2}$. The value of a is set to 0.0024 g cm$^{-2.0}$F$^{-1}$ and b is set to 0.004 g cm$^{-2}$.

The effect of fog and wind speed are added to Eq. 1.14 to move resulting visibilities lower in cases where there is important obstruction from these elements. Rearranging Eq. 1.14 to include fog and wind speed and including three scaling parameters gives:

$$\overline{vis}_0 = \frac{1.304 c_3 v_t}{\bar{q}_0}\left[\left(1 + \frac{\overline{wsp}_0}{\hat{wsp}}\right)^{\gamma}\left(1 + \frac{\overline{Fog}_0}{100}\right)^{\beta}\right]^{-1} \qquad \text{Eq. 1.16.}$$

The wind speed in mph and the probability of fog (unitless) are provided as inputs. The wind speed scaling parameter is thought to be a large value (perhaps 100 mph). Initially, the exponent $\gamma$ is set to unity and $\beta$ is set to 2.

Table 2 shows representative visibility estimates in statute miles, given different present weather regimes and precipitation rates.

TABLE 2

| Weather Type | Precip. Rate (in hr$^{-1}$ melted) | Temperature (° F.) | $C_3$ (g cm$^{-2}$) | $v_{t(ms^{-1})}$ | Fog | Wind (mph) | Resulting Visibility (miles) |
|---|---|---|---|---|---|---|---|
| Moderate Snow | 0.10 | 20 | .0.044 | 1.00 | 30% | 10 | 0.27 mi |
| Drizzle | 0.02 | 45 | 0.104 | 2.00 | 90% | 5 | 3.15 mi |
| Heavy Rain & Wind | 1.00 | 67 | 0.1568 | 6.5 | 10% | 25 | 0.77 mi |
| Light Rain | 0.10 | 55 | 0.128 | 6.5 | 20% | 10 | 6.60 mi |
| Wet Snow | 0.05 | 33 | 0.0752 | 2.00 | 20% | 10 | 2.14 mi |
| Icy Mix | 0.05 | 31 | 0.0704 | 4.00 | 20% | 10 | 3.94 mi |
| Dry Snow | 0.005 | 12 | 0.0248 | 1.00 | 20% | 10 | 3.59 mi |

Thus, as described above, a radar fingerprinting process is used to determine components, such as probability of precipitation, precipitation accumulation, precipitation rate, and horizontal visibility in order to estimate the current weather conditions from radar data. The radar fingerprinting may be implemented on a variety of computer platforms, and application specific operating systems. Still further, the present invention may be implemented in or across a plurality of processing chips or devices, and storage may similarly be effected across a plurality of devices. Therefore, the present invention should not be limited to any single embodiment, but rather should be construed in breadth and scope in accordance with the appended claims.

What is claimed is:

1. A method for estimating current weather conditions, comprising:
    receiving radar imagery;
    receiving an indication of a location of interest;
    deriving a synthetic estimate of present weather and associated meteorological conditions related to said location of interest from said radar imagery,
    wherein said associated meteorological conditions comprise at least one of a probability of precipitation, precipitation accumulation, precipitation rate, and horizontal visibility; and
    producing said synthetic estimate of present weather and associated meteorological conditions as an indication of current weather conditions at said location of interest.

2. The method of claim 1, further comprising:
    sampling said radar imagery around said location of interest to ascertain sampled radar imagery; and
    defining a matrix of reflectivity values from said sampled radar imagery.

3. The method of claim 2, wherein deriving said probability of precipitation further comprises:
    determining a radar coverage amount by applying a mask to said matrix of reflectivity values, said mask being determined in accordance with a type of precipitation indicated by said reflectivity values.

4. The method of claim 3, further comprising:
    determining a close-in clustering of said reflectivity values about said location of interest; and
    determining a fringe clustering of said reflectivity values near a fringe of said sampled radar imagery.

5. The method of 4, further comprising adjusting said probability of precipitation in accordance with a ratio of said close-in clustering and said fringe clustering.

6. The method of claim 5, further comprising applying a scaling factor to said probability of precipitation.

7. The method of claim 2, wherein deriving said precipitation rate further comprises:
    determining an average reflectivity from said matrix of reflectivity values; and
    converting said average reflectivity to a radar reflectivity factor.

8. The method of claim 2, wherein deriving said horizontal visibility further comprises:
    determining a fall velocity of precipitation;
    determining a rate of precipitation; and
    applying a constant to said fall velocity of precipitation and said rate of precipitation to determine said horizontal visibility.

9. The method of claim 8, further comprising determining said fall velocity in accordance with one of dry snow, wet snow and drizzle, mixed precipitation, and rain.

10. The method of claim 8, further comprising determining said constant in accordance with a temperature.

11. The method of claim 8 further comprising adjusting said horizontal visibility in accordance with at least one of fog and wind speed.

12. A computer readable medium containing computer executable instructions for estimating current weather conditions, said instructions for performing the steps of:
    receiving radar imagery;
    receiving an indication of a location of interest;
    deriving a synthetic estimate of present weather and associated meteorological conditions related to said location of interest from said radar imagery,
    wherein said associated meteorological conditions comprise at least one of a probability of precipitation, precipitation accumulation, precipitation rate, and horizontal visibility; and
    providing said synthetic estimate of present weather and associated meteorological conditions to produce said current weather conditions for said location of interest.

13. The computer readable medium of claim 12, further comprising instructions for:
    sampling said radar imagery around said location of interest to ascertain sampled radar imagery; and
    defining a matrix of reflectivity values from said sampled radar imagery.

14. The computer readable medium of claim 13, said instructions for deriving said probability of precipitation further comprising:
    determining a radar coverage amount by applying a mask to said matrix of reflectivity values, said mask being determined in accordance with a type of precipitation indicated by said reflectivity values.

15. The computer readable medium of claim 14, further comprising instructions for:
    determining a close-in clustering of said reflectivity values about said location of interest; and
    determining a fringe clustering of said reflectivity values near a fringe of said sampled radar imagery.

16. The computer readable medium of claim 15, further comprising instructions for adjusting said probability of precipitation in accordance with a ratio of said close-in clustering and said fringe clustering.

17. The computer readable medium of claim 16, further comprising instructions for applying a scaling factor to said probability of precipitation.

18. The computer readable medium of claim 13, said instructions for deriving said precipitation rate further comprising:
- determining an average reflectivity from said matrix of reflectivity values; and
- converting said average reflectivity to a radar reflectivity factor.

19. The computer readable medium of claim 13, said instructions for deriving said horizontal visibility further comprising:
- determining a fall velocity of precipitation;
- determining a rate of precipitation; and
- applying a constant to said fall velocity of precipitation and said rate of precipitation to determine said horizontal visibility.

20. The computer readable medium of claim 19, further comprising instructions for determining said fall velocity in accordance with one of dry snow, wet snow and drizzle, mixed precipitation, and rain.

21. The computer readable medium of claim 19, further comprising instructions for determining said constant in accordance with a temperature.

22. The computer readable medium of claim 19 further comprising adjusting said horizontal visibility in accordance with at least one of fog and wind speed.

* * * * *

UNITED STATES PATENT AND TRADEMARK OFFICE
CERTIFICATE OF CORRECTION

PATENT NO.         : 7,231,300 B1
APPLICATION NO.    : 11/021801
DATED              : June 12, 2007
INVENTOR(S)        : Bruce L. Rose, Jr.

It is certified that error appears in the above-identified patent and that said Letters Patent is hereby corrected as shown below:

<u>Column 1</u>,
Line 44, delete "is".

<u>Column 6</u>,
Line 3, delete "my" and insert -- may --.

Signed and Sealed this

Twenty-sixth Day of August, 2008

JON W. DUDAS
*Director of the United States Patent and Trademark Office*